United States Patent

Holmes

[11] Patent Number: 5,826,829
[45] Date of Patent: Oct. 27, 1998

[54] SPACECRAFT CONTROL SYSTEM WITH A TRIHEDRAL MOMENTUM BIAS WHEEL CONFIGURATION

[75] Inventor: Thomas Joseph Holmes, Portola Valley, Calif.

[73] Assignee: Space Systems/Loral Inc., Palo Alto, Calif.

[21] Appl. No.: 679,575

[22] Filed: Jul. 15, 1996

[51] Int. Cl.$^6$ ................................................. B64G 1/28
[52] U.S. Cl. ........................................ 244/165; 244/164
[58] Field of Search .............................. 244/158 R, 164, 244/165, 171

[56] References Cited

U.S. PATENT DOCUMENTS

| | | | |
|---|---|---|---|
| 3,591,108 | 7/1971 | Perkel | 244/165 |
| 3,940,096 | 2/1976 | Keigler et al. | 244/165 |
| 3,999,729 | 12/1976 | Mulfelder et al. | 244/165 |
| 4,071,211 | 1/1978 | Muhlfelder et al. | 244/165 |
| 4,084,772 | 4/1978 | Muhlfelder | 244/165 |
| 4,230,294 | 10/1980 | Pistiner | 244/165 X |
| 4,916,622 | 4/1990 | Raman et al. | |
| 5,058,835 | 10/1991 | Goodzeit et al. | 244/165 |
| 5,201,833 | 4/1993 | Goodzeit et al. | 244/165 |
| 5,205,518 | 4/1993 | Stetson, Jr. | 244/165 |
| 5,248,118 | 9/1993 | Cohen et al. | 244/164 |
| 5,279,483 | 1/1994 | Blanke et al. | 244/165 |
| 5,308,024 | 5/1994 | Stetson, Jr. | 244/165 |

*Primary Examiner*—William Grant
*Attorney, Agent, or Firm*—Perman & Green, LLP

[57] ABSTRACT

An active attitude control system for a spacecraft having first, second, and third mutually perpendicular axes utilizes four flywheels, at a minimum, which can selectively provide options of fully redundant momentum bias, ¾ redundant momentum bias, or fully redundant zero momentum bias. A plurality of reaction wheels are mounted on the spacecraft and rotatable on spin axes in a fixed configuration for together maintaining full three-axis control of the spacecraft to a predetermined attitude. A momentum wheel is also rotatable on the spacecraft about the first axis for maintaining gyroscopic stiffness. In the event of a failure of the momentum wheel, the reaction wheels may have a combined angular momentum sufficient to maintain the gyroscopic stiffness lost by the failure of the momentum wheel while maintaining full three-axis control of the spacecraft to a predetermined attitude. In one embodiment, the reaction wheels are mounted in a fixed trihedral configuration, a first reaction wheel being rotatable about a spin axis which lies in a plane of the first and second axes, and second and third reaction wheels being rotatable about spin axes which lie in a plane of the first axis and are oblique to the second and third axes.

21 Claims, 2 Drawing Sheets

SPACECRAFT CONTROL SYSTEM WITH A TRIHEDRAL MOMENTUM BIAS WHEEL CONFIGURATION

BACKGROUND OF THE INVENTION

1. Field of the Invention

This invention relates generally to operation of a spacecraft in its environment and, more particularly, to an active attitude control system which simultaneously provides active three-axis control, gyroscopic stiffness, and employs a minimum of four flywheels with redundancy in the event of a failure of one of the wheels.

2. Discussion of the Prior Art

Modern spacecraft, including satellites, are widely used for communications and earth sensing applications. All such satellite applications require control of the orientation of the satellite in space so that sensors and antennas may be pointed in appropriate directions. Satellites orbiting the earth, or other heavenly body, do not maintain a single face directed toward that body without additional control. This control is normally termed attitude control. One type of attitude control includes the use of one or more flywheels, which stabilize attitude by providing momentum bias or gyroscopic stiffness. A momentum bias can only indirectly stabilize satellite axes lying in a plane orthogonal to the bias axis, but direct control is not provided. To satisfy the more stringent orientation requirements associated with modern satellite missions, direct control of the satellite axes of rotation is required. Three axes are commonly used: the yaw axis is oriented toward the earth, the pitch axis is aligned with the satellite's orbit normal, and the roll axis completes the right-handed orthogonal axis set. Those skilled in the art know that other non-orthogonal sets can be used, and that simple transformations relate such sets to the orthogonal set.

The manufacture and launch of satellites is capital intensive to an extreme degree. Consequently, to hold down the unit cost of satellite services, a satellite must be operated for a long time. For this reason, satellite reliability is a major concern requiring such strong measures as redundancy, qualification and pre-launch test.

Typical three axis stabilized satellite attitude control is accomplished by directly sensing the three orthogonal attitudes: x, y, z, and commanding corrective control torques through reaction wheel actuators, or other torque generators. Such control often uses an Earth Sensor Assembly (ESA) to provide roll and pitch attitude information. A gyroscope is then used to provide the inertial yaw axis attitude information, because yaw errors (the yaw degree of freedom) are not observable with the ESA. Pitch and roll gyros are often used in ascent and earth acquisition phases of the satellite's launch. Once the earth has been acquired, however, the roll and pitch attitude information is derived from the ESA rather than from the gyros.

The ESA assembly can be fabricated without moving parts, and consequently, may be very reliable. Even so, redundancy assures availability of roll and pitch attitude information throughout the satellite's lifespan. However the yaw gyro is a mechanical device that is prone to failure. Direct redundancy is not normally used because of the gyro's high cost. One additional skew gyro provides the only redundancy for the three orthogonal gyros.

If the yaw gyro fails, the redundant skew gyro could be used to provide yaw attitude information, but information derived solely from the skew gyro is contaminated with pitch and roll information. In order to derive yaw attitude information from the skew gyro, the roll and pitch gyros are enabled to provide corrective signals. If, however, one of the roll or pitch gyros (or both) should also fail, no useful yaw information is available and the satellite attitude undesirably becomes unstable. In low cost satellites in which precision pointing is not required, the cost of the ESA and gyros may be excessive, and other inertial references may not be available. An improved attitude control system is therefore desired.

Specific examples of the prior art relating to attitude control of spacecraft are important for a complete understanding of the present invention.

U.S. Pat. Nos. 5,308,024 and 5,205,518 to Stetson, Jr. each disclose a satellite attitude control system which utilizes reaction wheels aligned, respectively, with the pitch, roll, and yaw axes of the satellite. The system is usable in the absence of any inertial yaw attitude reference, such as a gyroscope, and in the absence of a pitch bias momentum. Both the roll-yaw rigid body dynamics and the roll-yaw orbit kinematics are modelled. Pitch and roll attitude control are conventional. The model receives inputs from a roll sensor, and roll and yaw torques from reaction wheel monitors. The model produces estimated yaw which controls the spacecraft yaw attitude. The model further produces estimates of the constant component of the disturbance torques for compensation thereof.

U.S. Pat. No. 5,248,118 to Cohen et al. discloses a spacecraft attitude control system using one or more reaction wheels, the speed of which from time to time lie near and pass through zero angular velocity. When operated for extended periods of time at low speeds, the lubrication films are not distributed uniformly on the wheel bearings, leading to reduced lifetime. Reliability is maintained by a threshold comparator coupled to compare wheel speed with a lower limit value, for operating a torquer associated with the spacecraft body when the wheel speed drops below the lower limit, in a manner which tends to raise the wheel speed.

U.S. Pat. No. 5,201,833 to Goodzeit et al. discloses a spacecraft attitude control system which uses one or more momentum or reaction wheels. Wheel bearing viscous (velocity-dependent) friction reduces the actual torque imparted to the spacecraft in response to a torque command signal. Friction compensation is provided by applying the torque command signal to a model of an ideal, friction-free wheel, and calculating the speed which the ideal wheel achieves in response to the torque command. An error signal is generated from the difference between the ideal wheel speed and the actual wheel speed. The error signal is summed with the torque command signal to produce the wheel drive signal. This results in a closed-loop feedback system in which the actual wheel speed tends toward the ideal wheel speed, thereby causing a torque on the spacecraft which is substantially equal to that commanded.

U.S. Pat. No. 4,916,622 to Raman et al. discloses an attitude control system which uses magnetic torquing and is enhanced using a momentum wheel which is pivoted if the sensed error signal about the roll axis exceeds a given threshold. The momentum wheel is pivoted under control of a stepping motor through a first angle proportional to the detected average roll error, and one-half nutation period later through an equal angle in the same direction. Alternatively, the momentum wheel is pivoted over first and second angles of different values wherein the difference is related to nutation.

U.S. Pat. No. 4,230,294 to Pistiner discloses an attitude control and stabilization system for momentum biased satellites utilizing a pair of contra-rotating flywheels mounted parallel to its yaw axis. The speed of one of the wheels of the pair is controlled by sensing and correcting the roll axis errors of the satellite.

In U.S. Pat. No. 4,084,772 to Muhlfelder, roll and yaw attitude errors introduced by orbit inclination deviations from the nominal orbit plane are minimized by sinusoidally varying the momentum produced by a transverse wheel mounted on the spacecraft. The wheel is mounted on the spacecraft such that its axis is parallel to the spacecraft's yaw axis. Sinusoidal variation of wheel momentum is obtained by sinusoidally varying wheel speed in response to a sine wave signal periodically updated from an earth station. In response to the sinusoidal variation of transverse wheel momentum, the spacecraft is rolled to minimize thereby the roll error introduced by the orbit deviation from the nominal orbit plane. Yaw error is minimized by providing sufficient transverse wheel momentum so as to maintain the total spacecraft momentum vector perpendicular to the nominal orbit plane.

U.S. Pat. Nos. 4,071,211 and 3,999,729 to Muhlfelder et al. disclose control of an active three-axis multiple-wheel attitude control system which is provided with a bias momentum to achieve stiffness about the pitch axis. With this stiffness, the system overcomes the inherent inability of a zero momentum system employing the sun as its yaw reference to be provided with this yaw reference during the periods encompassing satellite high noon and midnight (i.e., approximate coalignment of the sun line and the local vertical). The satellite attitude is normally maintained by angular momentum exchange developed by three or more reaction wheels positioned on the satellite. The control mechanism is arranged to provide net angular momentum in the pitch axis wheels to achieve the momentum bias or stiffness along the pitch axis, whereas the time average of the angular momentum about the roll and yaw axes is substantially zero.

In U.S. Pat. No. 3,940,096 to Keigler et al., the orientation maneuver of a bias momentum stabilized spacecraft is achieved without the need of attitude determination by sensors and gyros and the like and without the conventional spin-down and spin-up procedures. The spacecraft is provided with a momentum wheel mounted in perpendicular relation to the axis of maximum moment of inertia. The wheel is initially de-energized during the time the spacecraft is initially launched from the ground launching platform until it is desired to orient the spacecraft in the final orbit. The momentum wheel, when energized from zero rotation to increasing rotation speeds, causes the rotation of the spacecraft from spinning about the maximum moment of inertia axis to an axis parallel to the momentum wheel axis with the final convergence of the wheel axis to the momentum vector being effected by energy dissipation in a nutation damper.

U.S. Pat. No. 3,591,108 to Perkel et al. discloses a control system for reducing undesirable motion in a spinning, orbiting satellite body. A satellite having an angular momentum stabilizing system aboard is compensated in a manner to substantially reduce undesired motion about an axis, which may be the spin axis. A motion sensor is placed aboard the satellite to derive a signal proportional to the direction and magnitude of the undesired motion. This signal is used to rotate a flywheel, whose axis of rotation is perpendicular to the spin axis of the satellite. The flywheel is rotated either clockwise or counterclockwise depending on the signal from the motion sensor, causing the flywheel to produce an equal and opposite torque to the disturbing torque about the spacecraft's spin axis. This action damps out the undesired motion by counteracting the undesired torque.

It was in light of the prior art as just described that the present invention was conceived and has now been reduced to practice.

SUMMARY OF THE INVENTION

The present invention is directed to an active attitude control system for a spacecraft and comprises a plurality of reaction wheels mounted on the spacecraft and rotatable on spin axes in a fixed configuration for together maintaining full three-axis control of the spacecraft to a predetermined attitude. A momentum wheel is also rotatable on the spacecraft about the first axis for maintaining gyroscopic stiffness. In the event of a failure of the momentum wheel, the reaction wheels may have a combined angular momentum sufficient to maintain the gyroscopic stiffness lost by the failure of the momentum wheel while maintaining full three-axis control of the spacecraft to a predetermined attitude. In one embodiment, the reaction wheels are mounted in a fixed trihedral configuration, a first reaction wheel being rotatable about a spin axis which lies in a plane of the first and second axes, and second and third reaction wheels being rotatable about spin axes which lie in a plane of the first axis and are oblique to the second and third axes. In each instance, the spin axis intersects the first axis. Also, each of the first, second, and third spin axes is tilted away from the first axis through an angle of $\theta_1$, and the second spin axis is tilted $\theta_2$ away from the first spin axis measured in a plane of the second and third axes, and the third spin axis is tilted $\theta_3$ away from the first spin axis measured in a plane of the second and third axes. The foregoing defines a fixed trihedral configuration.

Closest known attempted solutions to the problem solved by the present invention include the following:

(1) the v-wheel system which does not provide active control of yaw, and (b) requires thruster firings for large attitude maneuvers; because of jarring nature of thruster firings, this system is unsuitable for imaging spacecraft; while redundancy is provided for pitch and roll, none is provided for yaw;

(2) the magnetic torquer system requires a magnetic torquer which makes pointing susceptible to magnetic storms and is therefore unsuitable for imaging spacecraft;

(3) the thruster long term momentum management (TLTMM) system requires thruster firings to actively control yaw which consumes fuel and because of jarring nature of thruster firings is unsuitable for imaging spacecraft, (4) the tetrahedron zero-bias system (a) requires yaw sensors, which are usually full time gyros which could limit the life of the mission, and (b) with three wheels operating, at least one would be required to spin through zero rpm to maintain active 3-axis attitude control; this configuration does not allow a biased system such that gyroscopic effect is lost; also, a yaw sensor is required;

(5) the gimbaled wheel system typically uses stepper motors for creating quantum changes in pointing. Because of the jarring nature of stepper motors, similar to thruster firings, this system is unsuitable for imaging spacecraft. Also, movement is limited.

In contrast to the foregoing, the trihedral momentum bias (TMB) wheel configuration of the present invention provides a fully redundant wheel system that is suitable to maintain attitude for communications and imaging missions without active yaw sensing, magnetic torquers or active thruster firings. Using the three reaction wheels in a trihedral configuration, none of them need to spin through zero rpm if sized appropriately. If used with a gyroscope, this system can provide large attitude maneuvers (e.g., pitch earth acquisition) without using thrusters for active control.

The invention provides three axes of active nadir attitude control without (a) a yaw sensor (although a yaw sensor can be used if available), (b) magnetic torquers (which can be used for unloading wheel speeds during housekeeping), (c) thrusters (which can be used for unloading wheel speeds during housekeeping), or (d) gimbals or wheel articulation devices.

The trihedral momentum bias (TMB) wheel configuration of the invention uses four wheels of which any three can be used to provide the momentum bias and active nadir attitude three axis pointing. The four wheels are comprised of one momentum wheel and three reaction wheels. The three reaction wheels (typically smaller than the momentum wheel) are in a trihedral configuration which can provide the backup momentum bias should the momentum wheel fail. Full three-axis control would also be maintained if any one of the reaction wheels should fail. It is up to the user which of five available wheel combinations will be used for nominal operation. If the three reaction wheels are used for nominal operations, and the reaction wheels are sized properly, it is possible to achieve three-axis active attitude control without any wheels being required to spin through zero rpm.

A primary object of the present invention is to provide active three-axis attitude control of a spacecraft using three reaction wheels and a momentum wheel.

Another object of the invention is to provide such attitude control while maintaining gyroscopic stiffness of the spacecraft.

A further object of the invention is to provide such attitude control while providing some measure of redundancy in the event of a failure of one of the wheels. In one configuration, there would be biased momentum with biased momentum backup; in another configuration, there would be biased momentum with zero momentum backup; and in still another configuration, there would be zero momentum with zero momentum backup.

Yet another object of the invention is to provide such a system comprising a plurality of reaction wheels mounted on the spacecraft and rotatable on spin axes in a fixed configuration for together maintaining full three-axis control of the spacecraft to a predetermined attitude and a momentum wheel rotatable about the first axis for maintaining gyroscopic stiffness of the spacecraft in space about the first axis such that, in the event of a failure of the momentum wheel, the reaction wheels have a combined angular momentum sufficient to maintain the gyroscopic stiffness lost by the failure of said momentum wheel while maintaining full three-axis control of the spacecraft to a predetermined attitude.

Still a further object of the invention is to provide such a novel active attitude control system wherein there is a set of three reaction wheels rotatable on spin axes and mounted on the spacecraft in a fixed trihedral configuration.

Yet a further object of the invention is to provide such a novel active attitude control system wherein, in the event of a failure of any of the wheels, the combined angular momentum of the remaining ones of the wheels is effective to maintain gyroscopic stiffness about the first axis while also maintaining full three-axis control of the spacecraft in a predetermined attitude.

Still another object of the invention is to provide such a novel active attitude control system including a first reaction wheel which is rotatable about a first spin axis which lies in a plane of said first and second axes and intersects the first axis, a second reaction wheel which is rotatable about a second spin axis which lies in a plane of the first axis and oblique to the second and third axes and intersects the first axis, a third reaction wheel which is rotatable about a third spin axis which lies in a plane of the first axis and oblique to the second and third axes and intersects the first axis, with each of the first, second, and third spin axes being tilted away from the first axis through an angle of $\theta_1$, the second spin axis being tilted through an angle of $\theta_2$ away from said first spin axis measured in a plane of said second and third axes; and the third spin axis being tilted through an angle of $\theta_3$ away from the first spin axis measured in a plane of the second and third axes.

Other and further features and advantages of the present invention will become more apparent from the following detailed description, taken in conjunction with the accompanying drawings which illustrate, by way of example, the principles of the invention. Throughout the specification, like numerals refer to like parts.

DETAILED DESCRIPTION OF THE PREFERRED EMBODIMENTS

Figure 1:
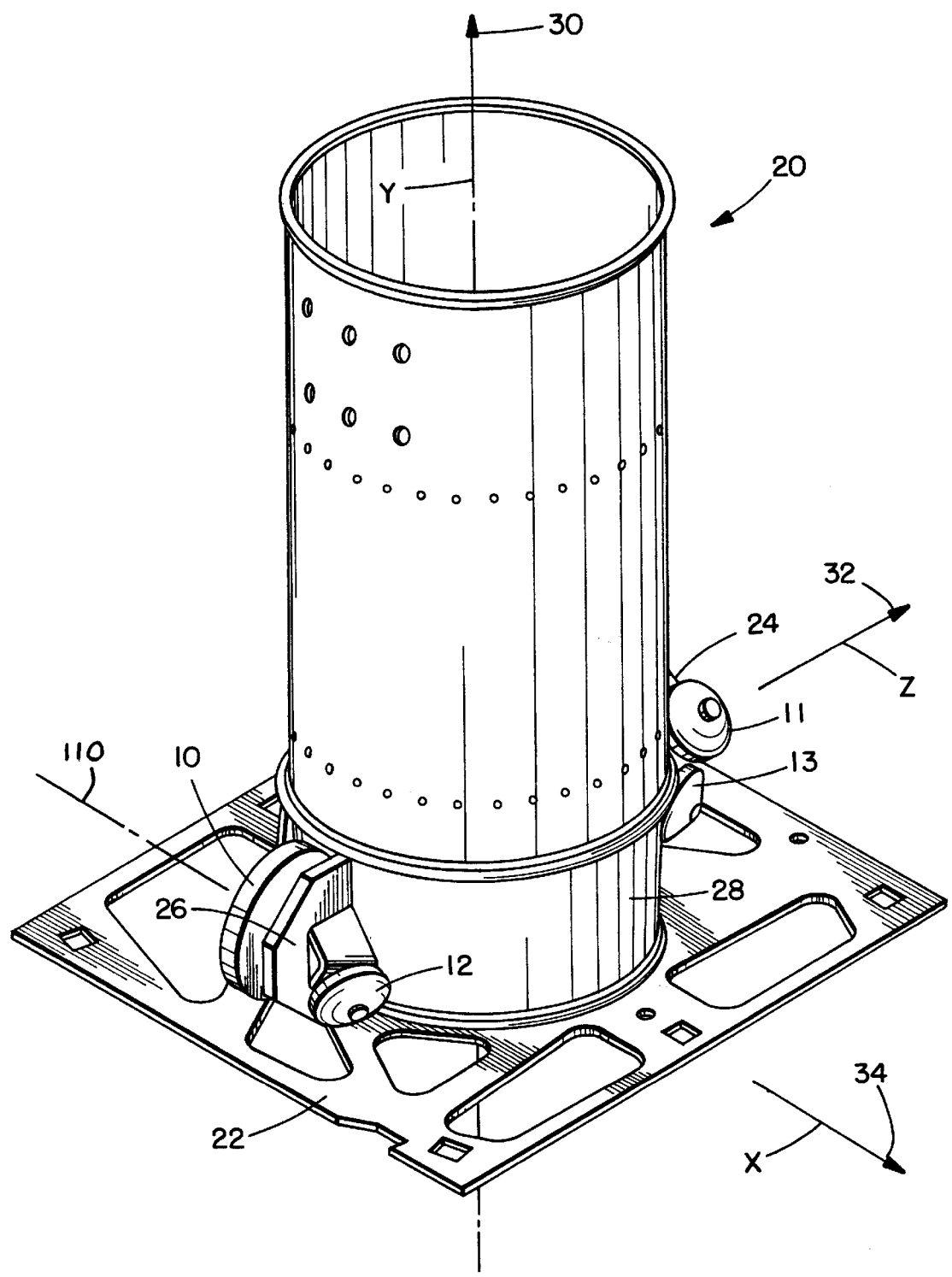
FIG. 1 is a perspective view of a component fixed to the structure of a spacecraft and on which is mounted an active attitude control system embodying the present invention.

Turn now to the drawings and, initially, to FIG. 1 which illustrates a component 20 of a spacecraft or satellite which is fixed to and projects away from a structural panel 22 of the spacecraft. The component 20 is depicted as being cylindrical but this is only by way of example. A pair of ears 24, 26 project radially from opposed sides of a skirt 28 fixed to the component 20. The component 20 is illustrated as having a set of mutually perpendicular axes, x, y, z. Conventionally, rotations about these axes are respectively referred to as roll, pitch and yaw. However, this disclosure should not be considered limited to this convention.

Figure 2:
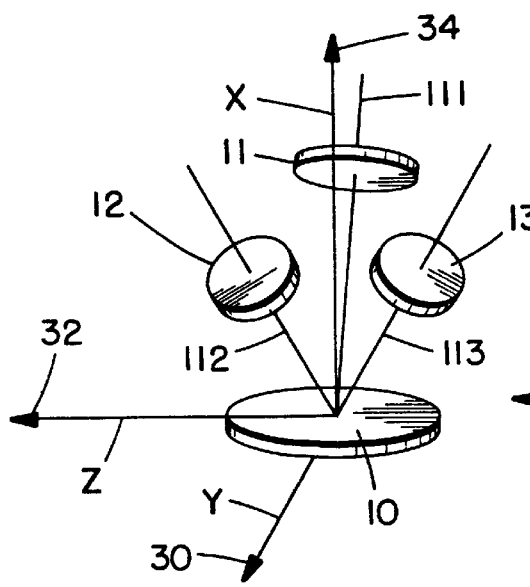
FIG. 2 is a diagrammatic perspective view illustrating the spatial relationship of the momentum wheel and the three reaction wheels which are the moving components of the active attitude control system of the present invention.
Figure 3:
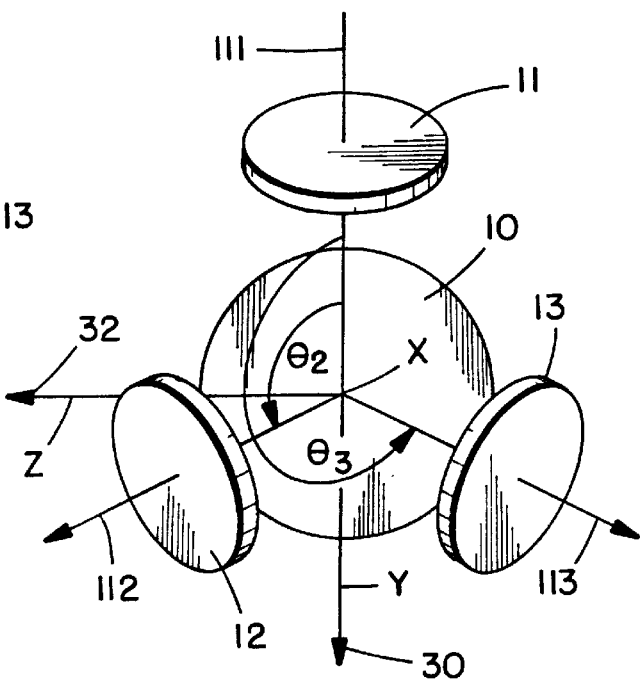
FIG. 3 is a diagrammatic top plan view of the components illustrated in FIG. 2.
Figure 4:
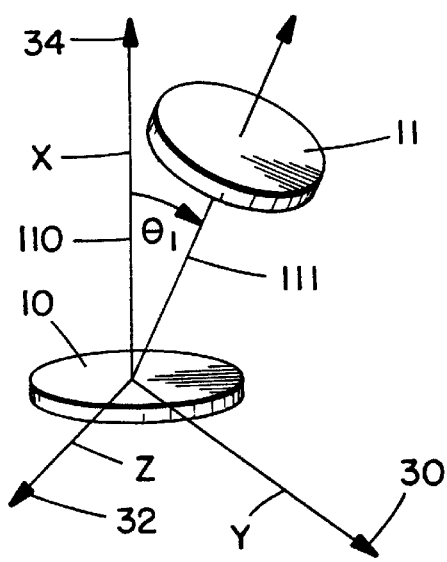
FIG. 4 is a diagramatic perspective view illustrating the relationship between the spin axis of each of the reaction wheels and the spin axis of the momentum wheel, the former being tilted away from the latter by an angle of $\theta_1$.

With continued reference to FIG. 1 and turning now also to FIGS. 2, 3, and 4, the satellite is provided with an active attitude control system embodying the present invention conveniently mounted on the pair of ears 24, 26. The control system includes a relatively large momentum wheel 10 mounted on ear 26, which wheel is rotatable about a spin axis 110 (FIG.4) parallel with the first axis x for maintaining gyroscopic stiffness of the spacecraft in space about the first axis. While the momentum wheel 10 is illustrated diagrammatically, or simplistically, it will be understood to include a flywheel, that is, any rotating wheel or disk used to store or transfer momentum, plus its associated parts, that is, bearings, torque motors, tachometers, other sensing devices, caging devices for launch, and control electronics.

The control system also includes a plurality of relatively smaller reaction wheels 11, 12, and 13 which, like the momentum wheel 10, are mounted on the spacecraft by means of ears 24, 26 and rotatable on spin axes 111, 112, and 113, respectively, in a fixed, trihedral, configuration for together maintaining full three-axis control of the spacecraft in a predetermined attitude. The reaction wheels are flywheels with a vehicle-fixed axis designed to operate at zero bias. In the event of a failure of the momentum wheel 10, the reaction wheels 11, 12, and 13 have a combined angular momentum sufficient to maintain the gyroscopic stiffness lost by the failure of the momentum wheel while maintaining full three-axis control of the spacecraft in a predetermined attitude. Further, in the event of a failure of any of the wheels, the combined angular momentum of the remaining wheels is effective to maintain gyroscopic stiffness about the first axis while also maintaining full three-axis control of the spacecraft in a predetermined attitude. In short, the momentum wheel 10 and the reaction wheels 11, 12, 13 are all rotatable about relatively fixed spin axes in a tetrahedral configuration for together maintaining gyroscopic stiffness and for maintaining three-axis control of the spacecraft.

As noted above, the first reaction wheel 11 is rotatable about the spin axis 111. Viewing FIGS. 3 and 4, it will be seen that the spin axis 111 lies in a plane of the x and y axes, intersecting the x axis at an angle $\theta_1$, and is oblique to the y and z axes. Similarily, the second and third reaction wheels 12, 13 are rotatable about the spin axes 112, 113, respectively, each of which lies in a plane parallel to the x axis, intersecting the x axis at the angle $\theta_1$, and is oblique to the y and z axes. Additionally, as shown in FIG. 3, the spin axis 112 of the reaction wheel 12 is displaced by an angle $\theta_2$ away from the spin axis 111, measured in the plane of the y and z axes, and the spin axis 113 of the reaction wheel 13 is displaced by an angle $\theta_3$ away from the spin axis 111, measured in the plane of the y and z axes. It will be appreciated that FIGS. 2, 3, and 4 are mathematical illustrations defining the angles of the spin vectors, or axes 110, 111, 112, 113, respectively, for the momentum wheel 10 and for the reaction wheels 11, 12, and 13. While in FIGS. 2, 3, and 4 the axes 110, 111, 112, and 113, are indicated as intersecting, in actual fact, they need not intersect. Only their angular orientation is required. For purposes of the invention, there are no requirements on the physical translation or placement of the wheels in space. Additionally, in the equations which are presented below, the axes 110, 111, 112, and 113 are not defined by position or displacement but only by angular orientation.

The overall operation of the invention can best be understood from a reading of the following description in conjunction with the information provided in Table 1.

TABLE 1

| Axis→ Wheel↓ | Momentum Storage Capacity | | |
|---|---|---|---|
| | 0 | 1 | 0×1 |
| 10 | $+I_0\omega_0$ | | |
| 11 | $\pm I_1\omega_1\cos(\theta_1)$ | $\pm I_1\omega_1\sin(\theta_1)$ | |
| 12 | $\pm I_1\omega_1\cos(\theta_1)$ | $\pm I_1\omega_1\sin(\theta_1)\cos(\theta_2)$ | $\pm I_1\omega_1\sin(\theta_1)\sin(\theta_2)$ |
| 13 | $\pm I_1\omega_1\cos(\theta_1)$ | $\pm I_1\omega_1\sin(\theta_1)\cos(\theta_3)$ | $\pm I_1\omega_1\sin(\theta_1)\sin(\theta_3)$ |
| All 4 | $+I_0\omega_0$ $\pm 3 I_1\omega_1\cos(\theta_1)$ | $\pm I_1\omega_1\sin(\theta_1)$ $[1-\cos(\theta_2)-\cos(\theta_3)]$ | $\pm I_1\omega_1\sin(\theta_1)$ $[\sin(\theta_2)-\sin(\theta_3)]$ |
| w/o 10 | $\pm 3 I_1\omega_1\cos(\theta_1)$ | $\pm I_1\omega_1\sin(\theta_1)$ $[1-\cos(\theta_2)-\cos(\theta_3)]$ | $\pm I_1\omega_1\sin(\theta_1)$ $[\sin(\theta_2)-\sin(\theta_3)]$ |
| w/o 11 | $+I_0\omega_0$ $\pm 2 I_1\omega_1\cos(\theta_1)$ | $\pm I_1\omega_1\sin(\theta_1)$ $[\cos(\theta_2)+\cos(\theta_3)]$ | $\pm I_1\omega_1\sin(\theta_1)$ $[\sin(\theta_2)-\sin(\theta_3)]$ |
| w/o 12 | $+I_0\omega_0$ $\pm 2 I_1\omega_1\cos(\theta_1)$ | $\pm I_1\omega_1\sin(\theta_1)$ $[1-\cos(\theta_3)]$ | $\pm I_1\omega_1\sin(\theta_1)$ $\sin(\theta_3)$ |
| w/o 13 | $+I_0\omega_0$ $\pm 2 I_1\omega_1\cos(\theta_1)$ | $\pm I_1\omega_1\sin(\theta_1)$ $[1-\cos(\theta_2)]$ | $\pm I_1\omega_1\sin(\theta_1)$ $\sin(\theta_2)$ | where:
$I_0$=inertia of the momentum wheel 10
$I_1$=inertia of the reaction wheels 11, 12, 13
$\omega_0$=maximum spin rate of the momentum wheel 10
$\omega_1$=maximum spin rate of the reaction wheels 11, 12, 13

Another set of relationships which will be of benefit in understanding the invention is presented in Table 2.

TABLE 2

| Axis→ Wheel↓ | Available Torque | | |
|---|---|---|---|
| | 0 | 1 | 0×1 |
| 10 | $+T_0$ | | |
| 11 | $\pm T_1\cos(\theta_1)$ | $\pm T_1\sin(\theta_1)$ | |
| 12 | $\pm T_1\cos(\theta_1)$ | $\pm T_1\sin(\theta_1)\cos(\theta_2)$ | $\pm T_1\sin(\theta_1)\sin(\theta_2)$ |
| 13 | $\pm T_1\cos(\theta_1)$ | $\pm T_1\sin(\theta_1)\cos(\theta_3)$ | $\pm T_1\sin(\theta_1)\sin(\theta_3)$ |
| All 4 | $\pm T_0$ $\pm 3 T_1\cos(\theta_1)$ | $\pm T_1\sin(\theta_1)$ $[1-\cos(\theta_2)-\cos(\theta_3)]$ | $\pm T_1\sin(\theta_1)$ $[\sin(\theta_2)-\sin(\theta_3)]$ |
| w/o 10 | $\pm 3 T_1\cos(\theta_1)$ | $\pm T_1\sin(\theta_1)$ $[1-\cos(\theta_2)-\cos(\theta_3)]$ | $\pm T_1\sin(\theta_1)$ $[\sin(\theta_2)-\sin(\theta_3)]$ |
| w/o 11 | $\pm T_0$ $\pm 2 T_1\cos(\theta_1)$ | $\pm T_1\sin(\theta_1)$ $[\cos(\theta_2)+\cos(\theta_3)]$ | $\pm T_1\sin(\theta_1)$ $[\sin(\theta_2)-\sin(\theta_3)]$ |
| w/o 12 | $\pm T_0$ $\pm 2 T_1\cos(\theta_1)$ | $\pm T_1\sin(\theta_1)$ $[1-\cos(\theta_3)]$ | $\pm T_1\sin(\theta_1)\sin(\theta_3)$ |
| w/o 13 | $\pm T_0$ $\pm 2 I_1\cos(\theta_1)$ | $\pm T_1\sin(\theta_1)$ $[1-\cos(\theta_2)]$ | $\pm T_1\sin(\theta_1)$ $\sin(\theta_2)$ | where:
$T_0$=torque of the momentum wheel 10
$T_1$=torque of the reaction wheels 11, 12, 13

As previously noted, the four wheels in this configuration are comprised of one momentum wheel 10 and three reaction wheels 11, 12 and 13. The momentum wheel maintains the momentum stiffness to provide resistance to disturbances that could cause errors in the spacecraft yaw pointing. Momentum stiffness occurs because of the gyroscopic effect of the momentum wheel.

The three reaction wheels are located or oriented to maintain full three axis attitude control of the spacecraft and gyroscopic stiffness should the momentum wheel fail.

If sized similarly, each reaction wheel should provide at least one third of the momentum of wheel 10; if sized differently, the three reaction wheels together should provide momentum at least as great as that of the wheel 10 if gyroscopic stiffness redundancy is desired. Examining FIGS. 1–4, one can follow the placement of the reaction wheels 11, 12 and 13 with the following description. Begin with all three reaction wheels in the same orientation as the momentum wheel 10, that is, with all of their spin axes aligned or coincident. This provides the redundancy for momentum stiffness. In order to gain control about the y axis, the wheels are tilted with respect to the y axis (see FIG. 2). Then, leaving the first reaction wheel 11 where it is, the other two reaction wheels 12, 13 are moved around the x axis (indicated as a point in FIG. 3) to provide control about the z axis (the z axis is defined mathematically as x cross y to provide an orthogonal set of axes according to the right hand rule). In this manner, full three axis attitude control of the spacecraft is assured in all three axes. If wheel 10 becomes inoperative, then wheels 11, 12 and 13 can be spun up together to maintain the momentum stiffness on the x axis that was lost with wheel 10 spinning down. If wheel 11 fails, wheels 12 and 13 can be activated together to provide momentum in the y direction as represented by an arrowhead 30 (FIGS. 2 and 3). If wheel 12 fails, wheel 13 can provide momentum in the z direction as represented by an arrowhead 32 (FIGS. 2 and 3), and vice versa if wheel 13 fails.

Table 1 provides an example of the mathematics associated with the location and performance of the wheels, individually, and during failure. In the table, the reaction wheels 11, 12, 13 are all similarly sized. They could be sized differently with the understanding that their collective momenta would be greater than that of the momentum wheel 10 if full redundancy of gyroscopic stiffness is required; however, understandably, the mathematical relationships would thereby become much more complex.

The second column ("x") indicates the momentum storage capability in the x direction, the direction of gyroscopic stiffness, as represented by an arrowhead 34 (FIGS. 2 and 4). The first 4 rows ("10", "11", "12", "13") indicate the individual contributions of each wheel. The spin axis 110 of momentum wheel 10 is aligned in the x direction, therefore, all of its momentum ($I_0 \omega_0$) contributes in this direction. Reaction wheels 11, 12, and 13 are tilted down somewhat (by $\theta_1$ with respect to the x axis) to provide a momentum storage component in the x direction. Their orientation is illustrated in FIG. 4 for reaction wheel 11 and is identical for reaction wheels 12 and 13. Storage capacity in the x direction is reduced by the cosine of this angle, $\theta_1$. This angle is the critical angle selected to maintain the gyroscopic stiffness when the momentum wheel fails as indicated in the sixth row ("w/o 10"). This row indicates that all reaction wheels contribute equally to the stiffness through the cosine of $\theta_1$.

The third column ("y") indicates the momentum storage capability in the y direction, that is, perpendicular to axis x, the direction of gyroscopic stiffness. The second row ("11") indicates that the first contributor of momentum storage to the y axis is reaction wheel 11. As the reaction wheels are tilted down from the x axis by $\theta_1$ (FIG. 4), the effect of the sine to increase the contribution to axis y changes more rapidly than the effect of the cosine to decrease the contribution to axis x. This means this design can increase control of the y axis without significantly sacrificing its ability to maintain gyroscopic stiffness as indicated in the second column ("x"). The other reaction wheels, 12 and 13, are needed to provide momentum in the z axis, therefore, their spin axes are rotated away from the spin axis 111 of wheel 11 by $\theta_2$ and $\theta_3$, respectively, in the y-z plane as in FIG.3.

Examining rows 3 and 4 ("12","13"), it is seen that the contribution of the reaction wheels 12 and 13 to momentum storage along the y axis is decreased by the cosine of the angles ($\theta_2$ and $\theta_3$, respectively) in a similar manner that the contribution to momentum storage along the x axis by all three wheels is decreased by the cosine of $\theta_1$.

The fourth column ("z") indicates the momentum storage capability in the z direction, which is perpendicular to both axes x and y following the right hand rule and is the mathematical cross product of x and y. The third and fourth rows ("12", "13") indicate the momentum contributions to the z axis by reaction wheels 12 and 13. As the reaction wheels 12 and 13 are located away from the y axis by angles $\theta_2$ and $\theta_3$, respectively, the effect of the sine increases the momentum contribution to the z axis and the effect of the cosine decreases the momentum contribution to the y axis (see the third column ("y"). There is no change to the gyroscopic stiffness as indicated in the second column ("x"). The cosine of angles $\theta_2$ and $\theta_3$ provides backup redundancy for momentum in the y axis should reaction wheel 11 fail. The sine of $\theta_2$ provides backup redundancy for momentum in the z axis should reaction wheel 13 fail, and vice versa for $\theta_3$ and reaction wheel 12. Rows 6 through 9 ("w/o 10", "w/o 11", "w/o 12", "w/o 13") explicate the redundancy built into this invention. Should the momentum wheel 10 fail, the reaction wheels all contribute momentum components together along the x axis to maintain the gyroscopic stiffness as indicated in the second column ("x") and the sixth row ("w/o 10"). When the first reaction wheel 11 fails, the second and third reaction wheels 12 and 13 combine to provide momentum storage in the y direction as indicated in the third column ("y") and the seventh row ("w/o 11"). Failure of the second and third reaction wheels 12 and 13 are indicated in rows 8 and 9 ("w/o 12" and"w/o 13"). The third and second wheels 13 and 12, respectively, provide the backup in the z direction as indicated in the fourth column ("z"). That is, wheel 13 backs up a wheel 12 failure ("w/o 12") and wheel 12 backs up a wheel 13 failure ("w/o 13").

EXAMPLE

An example can best demonstrate how to size ($I_0$, $\omega_0$, $I_1$, $\omega_1$) and position the momentum wheel 10 and the reaction wheels 11, 12, 13 ($\theta_1, \theta_2, \theta_3$) for a particular set of spacecraft requirements. Table 2 will be used as the basis for this analysis. In order to achieve a desired mission requirement, let us begin with a momentum bias capacity of 40 Newton-meter-seconds (Nms) with ±10 Nms and the fact that the reaction wheels are similiarly sized. This means that the momentum wheel 10 must have a momentum storage capacity of 50 Nms ($+I_0\omega_0$). In the event the momentum wheel 10 fails, the size and position requirements of the reaction wheels are such that $I_1\omega_1 \cos(\theta_1) = 50/3$ (see Table 2 for "w/o 10" and the momentum storage capacity for the x axis).

Let us say that the storage requirement in the y direction is ±12 Nms and ±8 Nms in the z direction. To handle a reaction wheel failure, this implies that $\theta_3=360-\theta_2$; $I_{1\omega hd 1} \sin(\theta_1) \cos(\theta_2) = 6$ Nms; and $I_{1\omega 1} \sin(\theta_1) \sin(\theta_3) = 8$ Nms. Solving these four nonlinear equations for the four unknowns results in approximate requirements of $I_1\omega_1=20$ Nms; $\theta_1 = 30$ degrees; and $\theta_3=127$ degrees.

To recapitulate the foregoing, the present invention provides an active attitude control system for a spacecraft which utilizes four flywheels, at a minimum, which can selectively provide the following options:

fully redundant momentum bias;
 ¾ redundant momentum bias; and
 fully redundant zero momentum bias.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. An active attitude control system for a spacecraft having first, second, and third mutually perpendicular axes comprising:

a plurality of reaction wheels mounted on the spacecraft and rotatable on spin axes in a fixed configuration for together maintaining full three-axis control of the spacecraft to a predetermined attitude; and a momentum wheel rotatable about said first axis for maintaining gyroscopic stiffness of the spacecraft in space about said first axis; and means for providing, in the event of a failure of said momentum wheel, said reaction wheels with a combined angular momentum sufficient to maintain the gyroscopic stiffness lost by the failure of said momentum wheel while maintaining full three-axis control of the spacecraft to a predetermined attitude.

2. An active attitude control system as set forth in claim 1 wherein said plurality of reaction wheels comprise a set of three reaction wheels rotatable on spin axes and mounted on the spacecraft in a fixed trihedral configuration.

3. An active attitude control system as set forth in claim 1 further comprising means for providing, in the event of a failure of any of said wheels, combined angular momentum to the remaining ones of said wheels effective to maintain gyroscopic stiffness about said first axis while also maintaining full three-axis control of the spacecraft in a predetermined attitude.

4. An active attitude control system as set forth in claim 1 wherein said plurality of reaction wheels include:
- a first reaction wheel which is rotatable about a first spin axis that lies in a plane of said first and second axes and intersects said first axis;
- a second reaction wheel rotatable about a second spin axis which lies in a plane of and intersects said first axis and is oblique to said second and third axes;
- a third reaction wheel rotatable about a third spin axis which lies in a plane of and intersects said first axis and is oblique to said second and third axes;
- each of said first, second, and third spin axes intersecting said first axis at an angle of $\theta_1$;
- said second spin axis being displaced at an angle $\theta_2$ from said first spin axis measured in a plane of said second and third axes; and
- said third spin axis being displaced at an angle $\theta_3$ from said first spin axis measured in a plane of said second and third axes.

5. An active attitude control system as set forth in claim 4 wherein said momentum wheel provides a momentum storage capacity in the direction of said first axis of $+I_0 \omega_0$
where $I_0$=inertia of the momentum wheel; and
where $\omega_0$=maximum spin rate of the momentum wheel; and
wherein each of said first, second, and third reaction wheels provide a momentum storage capacity in the direction of said first axis of $\pm I_1 \omega_1 \cos(\theta_1)$;
where $I_1$=inertia of the reaction wheels; and
where $\omega_1$=maximum spin rate of the reaction wheels.

6. An active attitude control system as set forth in claim 4 wherein said momentum wheel provides a momentum storage capacity in the direction of said second axis of zero;
wherein said first reaction wheel provides a momentum storage capacity in the direction of said second axis of $\pm I_1 \omega_1 \sin(\theta_1)$;
wherein said second reaction wheel provides a momentum storage capacity in the direction of said second axis of $\pm I_1 \omega_1 \sin(\theta_1) \cos(\theta_2)$; and
wherein the momentum storage capacity provided by said third reaction wheel in the direction of said second axis is $\pm I_1 \omega_1 \sin(\theta_1) \cos(\theta_3)$
where $I_1$=inertia of the reaction wheels; and
where $\omega_1$=maximum spin rate of the reaction wheels.

7. An active attitude control system as set forth in claim 4 wherein said momentum wheel provides a momentum storage capacity in the direction of said third axis of zero;
wherein said first reaction wheel provides a momentum storage capacity in the direction of said third axis of zero;
wherein said second reaction wheel provides a momentum storage capacity in the direction of said third axis of $\pm I_1 \omega_1 \sin(\theta_1) \sin(\theta_2)$; and
wherein said third reaction wheel provides a momentum storage capacity in the direction of said third axis of $\pm I_1 \omega_1 \sin(\theta_1) \sin(\theta_3)$
where $I_1$=inertia of the reaction wheels; and
where $\omega_1$=maximum spin rate of the reaction wheels.

8. An active attitude control system as set forth in claim 4 wherein said momentum wheel and all of said first, second, and third reaction wheels provide a maximum momentum storage capacity in the direction of said first axis of $+I_0 \omega_0 \pm 3I_1\omega_1 \cos(\theta_1)$
where $I_0$=inertia of the momentum wheel;
where $\omega_0$=maximum spin rate of the momentum wheel;
where $I_1$=inertia of the reaction wheels; and
where $\omega_1$=maximum spin rate of the reaction wheels.

9. An active attitude control system as set forth in claim 4 wherein said first, second, and third reaction wheels provide a sum of the momentum storage capacity in the direction of said first axis, in the event of a failure of said momentum wheel, of $\pm 3I_1\omega_1\cos(\theta_1)$
where $I_1$=inertia of the reaction wheels; and
where $\omega_1$=maximum spin rate of the reaction wheels.

10. An active attitude control system as set forth in claim 4 wherein said momentum wheel and any two of said first, second and third reaction wheels provide a sum of the momentum storage capacity in the direction of said first axis, in the event one of said first, second, and third reaction wheels is disabled, of $+I_0\omega_0 \pm 2I_1\omega_1 \cos(\theta_1)$
where $I_0$=inertia of the momentum wheel;
where $\omega_0$=maximum spin rate of the momentum wheel;
where $I_1$=inertia of the reaction wheels; and
where $\omega_1$=maximum spin rate of the reaction wheels.

11. An active attitude control system as set forth in claim 4 wherein said momentum wheel and all of said first, second, and third reaction wheels provide a total sum of the momentum storage capacity in the direction of said second axis of $\pm I_1 \omega_1 \sin(\theta_1)[1-\cos(\theta_2)-\cos(\theta_3)]$
where $I_1$=inertia of the reaction wheels; and
where $\omega_1$=maximum spin rate of the reaction wheels.

12. An active attitude control system as set forth in claim 4 wherein said first, second, and third reaction wheels provide a sum of the momentum storage capacity in the direction of said second axis, in the event of a failure of said momentum wheel, of $\pm I_1 \omega_1 \sin(\theta_1) [1-\cos(\theta_2)-\cos(\theta_3)]$ where $I_1$=inertia of the reaction wheels; and where $\omega_1$=maximum spin rate of the reaction wheels.

13. An active attitude control system as set forth in claim 4 wherein said momentum wheel and said second and third reaction wheels provide a sum of the momentum storage capacity in the direction of said second axis, in the event said first reaction wheel is disabled, of $\pm I_1 \omega_1 \sin(\theta_1) [\cos(\theta_2)+\cos(\theta_3)]$ where $I_1$=inertia of the reaction wheels; and where $\omega_1$=maximum spin rate of the reaction wheels.

14. An active attitude control system as set forth in claim 4 wherein said momentum wheel and said first and third reaction wheels provide a sum of the momentum storage capacity in the direction of said second axis, in the event said second reaction wheel is disabled, of $\pm I_1 \omega_1 \sin(\theta_1) [1-\cos(\theta_3)]$ where $I_1$=inertia of the reaction wheels; and where $\omega_1$=maximum spin rate of the reaction wheels.

15. An active attitude control system as set forth in claim 4 wherein said momentum wheel and said first and second reaction wheels provide a sum of the momentum storage capacity in the direction of said second axis, in the event said third reaction wheel is disabled, of $\pm I_1 \omega_1 \sin(\theta_1) [1-\cos(\theta_2)]$ where $I_1$=inertia of the reaction wheels; and where $\omega_1$=maximum spin rate of the reaction wheels.

16. An active attitude control system as set forth in claim 4 wherein said momentum wheel and all of said first, second, and third reaction wheels provide a total sum of the momentum storage capacity in the direction of said third axis of $\pm I_1 \omega_1 \sin(\theta_1) [\sin(\theta_2)-\sin(\theta_3)]$ where $I_1$=inertia of the reaction wheels; and where $\omega_1$=maximum spin rate of the reaction wheels.

17. An active attitude control system as set forth in claim 4 wherein said first, second, and third reaction wheels provide a sum of the momentum storage capacity in the direction of said third axis, in the event of a failure of said momentum wheel, of $\pm I_1 \omega_1 \sin(\theta_1) [\sin(\theta_2)-\sin(\theta_3)]$ where $I_1$=inertia of the reaction wheels; and where $\omega_1$=maximum spin rate of the reaction wheels.

18. An active attitude control system as set forth in claim 4 wherein said momentum wheel and said second and third reaction wheels provide a sum of the momentum storage capacity in the direction of said third axis, in the event said first reaction wheel is disabled, of $\pm I_1 \omega_1 \sin(\theta_1) [\sin(\theta_2)-\sin(\theta_3)]$ where $I_1$=inertia of the reaction wheels; and where $\omega_1$=maximum spin rate of the reaction wheels.

19. An active attitude control system as set forth in claim 4 wherein said momentum wheel and said first and third reaction wheels provide a sum of the momentum storage capacity in the direction of said third axis, in the event said second reaction wheel is disabled, of $\pm I_1 \omega_1 \sin(\theta_1) \sin(\theta_3)$ where $I_1$=inertia of the reaction wheels; and where $\omega_1$=maximum spin rate of the reaction wheels.

20. An active attitude control system as set forth in claim 4 wherein said momentum wheel and said first and second reaction wheels provide a sum of the momentum storage capacity in the direction of said third axis, in the event said third reaction wheel is disabled, of $\pm I_1 \omega_1 \sin(\theta_1) \sin(\theta_2)$ where $I_1$=inertia of the reaction wheels; and where $\omega_1$=maximum spin rate of the reaction wheels.

21. An active attitude control system for a spacecraft having first, second, and third mutually perpendicular axes comprising:

a plurality of reaction wheels mounted on the spacecraft and rotatable on spin axes in a fixed configuration for together providing full three-axis control of the spacecraft to a predetermined attitude; and a momentum wheel rotatable about said first axis for maintaining momentum bias of the spacecraft in space about said first axis; and said reaction wheels having angular momentum sufficient to maintain full three-axis control of the spacecraft to a predetermined attitude; said reaction wheels being sized and configured for providing ¾ redundant momentum bias should any one of said reaction wheels fail and zero momentum bias backup should the momentum wheel fail.

* * * * *